Dec. 6, 1949 W. D. TEAGUE, JR 2,490,174
CONTROL SERVO UNIT-HYDRAULIC ACTUATOR
Filed May 29, 1947 3 Sheets-Sheet 2
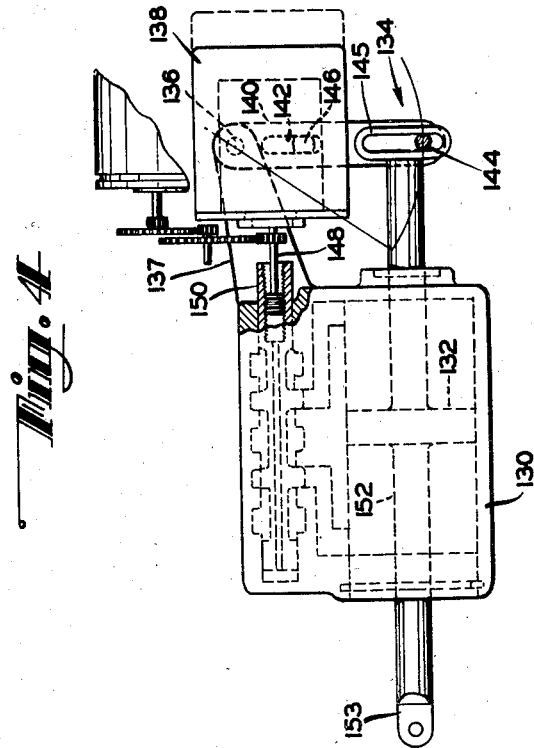
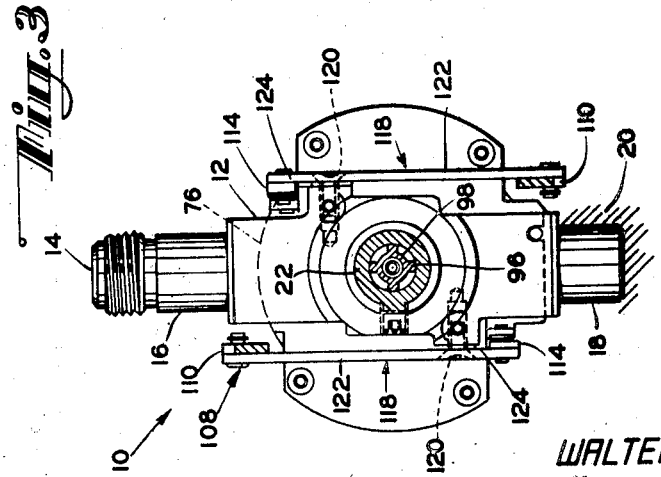
INVENTOR.
WALTER D. TEAGUE, JR.
BY
Frederic H. Miller
- ATTORNEY -

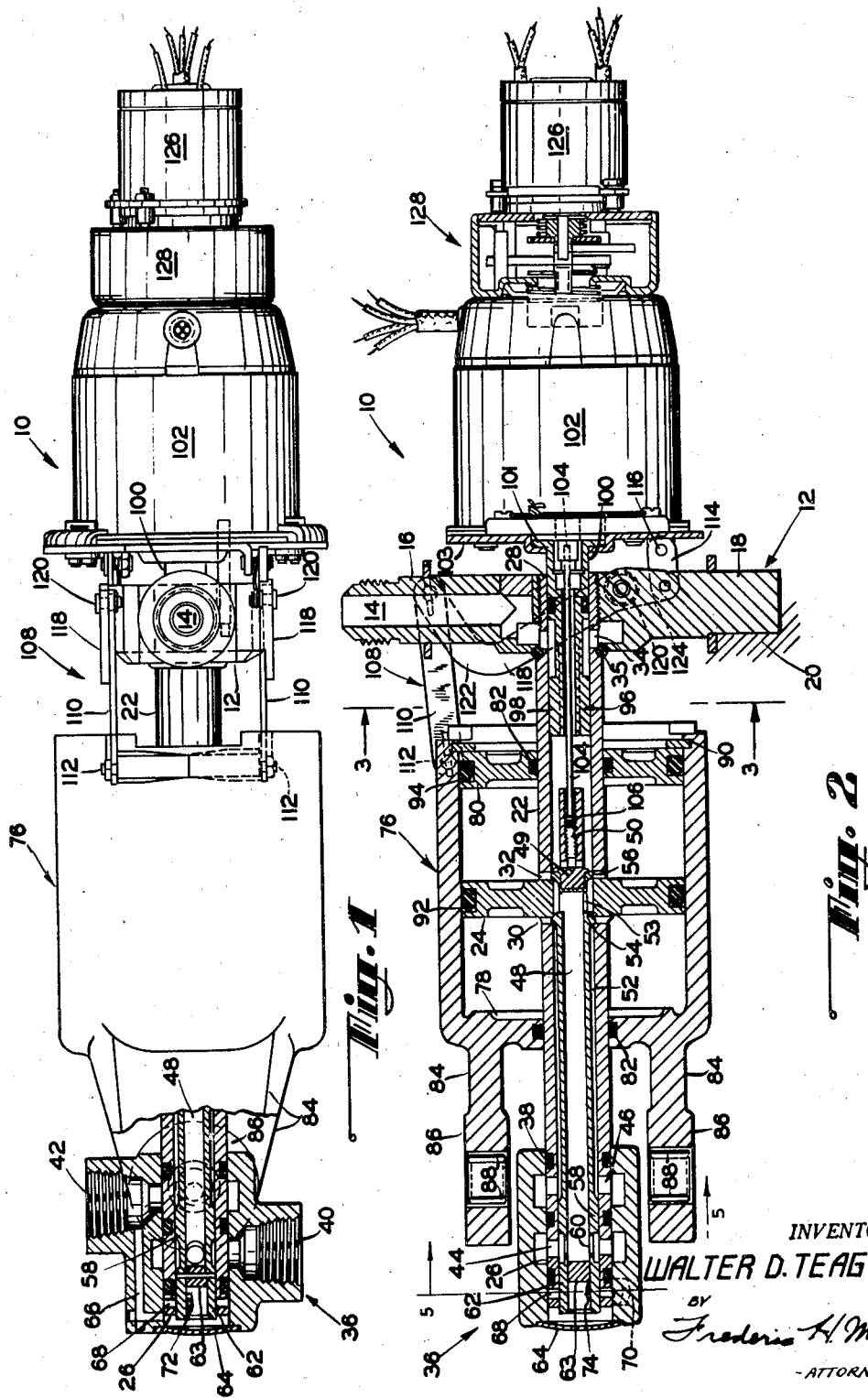

Dec. 6, 1949　　　W. D. TEAGUE, JR　　　2,490,174
CONTROL SERVO UNIT-HYDRAULIC ACTUATOR
Filed May 29, 1947　　　3 Sheets-Sheet 3
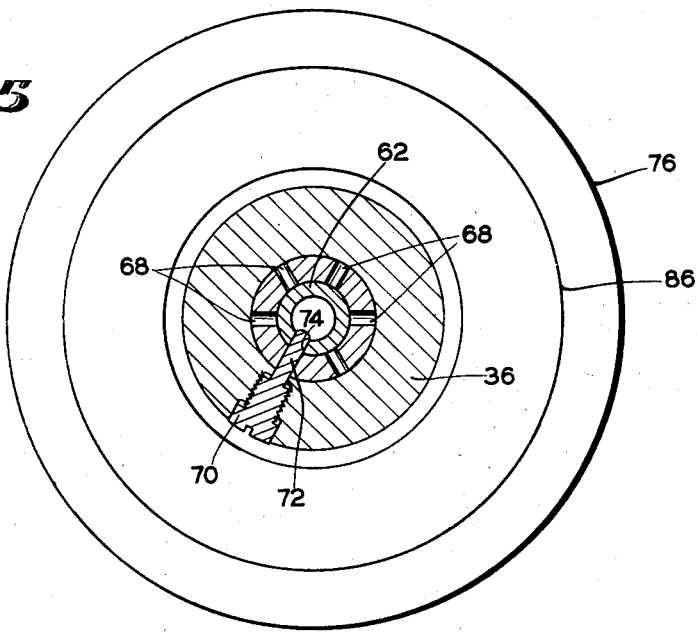
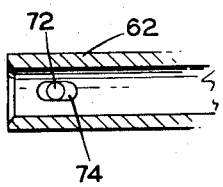
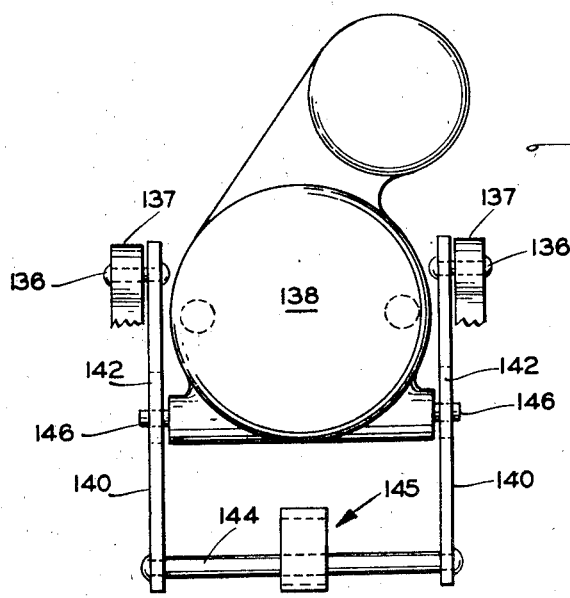
INVENTOR.
WALTER D. TEAGUE, JR.
BY
— ATTORNEY —

Patented Dec. 6, 1949

2,490,174

UNITED STATES PATENT OFFICE 2,490,174

CONTROL SERVO UNIT-HYDRAULIC ACTUATOR

Walter Dorwin Teague, Jr., Alpine, N. J., assignor to Bendix Aviation Corporation, Teterboro, N. J., a corporation of Delaware Application May 29, 1947, Serial No. 751,171

11 Claims. (Cl. 121—41)

1

The present invention relates to servo units, and particularly to a novel servo unit for actuating a movable control element such, for example, as an aileron, rudder or elevator of an aircraft, in response to a control signal.

One of the objects of the invention is to overcome disadvantages of prior units of such character, and to do so by novel, effective means.

Another object is to provide a novel servo unit which is compact, light in weight, and constructed of parts of simple form and minimum number.

Another object is to provide a novel device including a cylinder and piston either of which may be movable and controlled by a valve member movable in either direction, in which the movement of the valve in each direction is initiated by a valve actuating means and opposed by the cylinder or piston to move the valve to null position through means translating the movement of the cylinder or piston into the movement of the valve.

Another object is to provide such translating means in a form, such as linkage, whereby movement of the piston or cylinder may be of different extent or kind from the movement of the controlling valve member, and translate the movement of the piston or cylinder into the movement of the valve member.

Another object is to reduce the number of valve elements, such as ports, lands, and the like, in a servo unit of the type indicated, as compared to similar prior units.

Another object is to provide a novel servo unit which is simple and durable in construction, economical to manufacture, and effective in its operation.

The above and other objects and features of the invention will appear more fully hereinafter from a consideration of the following description taken in connection with the accompanying drawings wherein two embodiments of the invention are illustrated by way of example. It is to be understood, however, that the drawings are for the purpose of illustration only, and are not designed as a definition of the limits of the invention.

In the drawings wherein like reference characters refer to like parts in the several views:

Figure 1 is a side view, generally in elevation but having a portion in section, of a novel servo unit constructed in accordance with the invention;

Figure 2 is a side view of the device of Figure 1 at right angles thereto, generally in section and having portions in elevation;

2

Figure 3 is a view taken substantially along the line 3—3 of Figure 2; and

Figure 4 is a semi-diagrammatic view of a servo unit constructed in accordance with an alternative form of the invention.

Figure 5 is a sectional view taken along the line 5—5 of Figure 2.

Figure 6 is a fragmentary sectional view showing the end construction of the control valve of Figures 1 and 2.

Figure 7 is an end view of the device of Figure 4 looking from right to left with the piston casing removed.

Referring to Figures 1 to 3, inclusive, a servo unit 10 comprises an elongated support 12 having a drain 14 and spaced bearings 16 and 18 adapted to be journaled on a base 20. A hollow piston shaft 22 includes a piston 24 integral with the shaft intermediate the shaft ends 26 and 28, and has radial ports 30 and 32, Figure 2, at opposite sides of the piston adjacent thereto. The end 28 is screw threaded into the support 12 through the left side thereof as shown, at right angles to or radially of the support intermediate the bearings 16 and 18. The end 28 is provided with apertures 34 by which the shaft 22 communicates with the drain 14. The shaft 22 is held against rotation relative to the support 12, and provided with a seal ring 35.

A fluid pressure head 36, sealed on the shaft 22, as by ring seals 38 adjacent to the shaft end 26, includes axially offset inlet and outlet openings 40 and 42, communicating through separate openings 44 and 46, respectively, in the shaft wall.

A tubular valve 48, axially slidable in the shaft 22, has a fixed end closure plug portion 49 having an interior screw 50 and different outer diameters forming passageway means 52 between the shaft 22 and the valve 48. A pair of lands 54 and 56 are formed in the valve 48 for the ports 30 and 32, respectively, and a single land 58 is provided between the inlet 40 and the outlet 42. The inlet 40 communicates through the opening 44 and an opening 60 in the valve with the interior of the valve 48, and the outlet 42 communicates, through the opening 46 in the shaft 22, with the passageway means 52 between the lands 54 and 58. The interior of the valve 48 communicates with the passageway means 52 through an opening 53 in the valve at a position between the lands of the pair of lands 54 and 56. The valve 48 is provided with a land 62 and a plug 63 between the inlet 40 and the adjacent end of the valve sealing the latter end, which is further closed by a disc 64 press fitting the head 36. A duct 66, Figure 1, provides drainage for oil seepage from the valve to the outlet or drain 42.

Between the disc 64 and the land 62, the shaft 22 is provided with a plurality of peripherally spaced radial holes 68, in any one of which a screw 70, Figure 2, in the body of the head 36, has an unthreaded portion 72 extending into a slot 74 of the valve as shown in Figure 5.

A cylinder 76, between the support 12 and the head 36, is slidable on the piston 24 and is provided with end walls 78 and 80 at opposite sides of the piston and the ports 30 and 32, in slidable relation to the shaft 22 sealed thereto, as by ring seals 82. The wall 78, in this instance, is integral with the cylinder 76 and has axial arms 84 extending to portions 86 at opposite sides of the head 36 adapted, as by needle bearings 88, for pivotal connection to means to be actuated, such as a movement control device or lever of an airplane aileron, elevator, or the like.

The other cylinder end wall 80 is removably held to the cylinder 76, as by a lock ring 90 expanded into a groove in the cylinder wall. The piston 24 and the wall 80 are provided with ring seals 92 and 94, respectively.

A tubular member 96, slidable in the shaft 22, has a portion 98 of substantially cruciform section, Figure 3, forming grooves providing communication between the valve 48 and the drain 14. The member 96 has a portion 100, at the side of the support 12 opposite the side from which the shaft 22 protrudes, which portion 100 is connected to a reversible motor 102, as by a flange 101 on the portion 100 and a plate 103 on the motor 102. A shaft 104 of the motor 102 extends through the tubular member 96 and is provided with a screw jack 106 in the valve screw 50.

Means 108, connected between the cylinder 76 and the motor 102, is responsive to any movement of the cylinder 76, along the shaft 22 in either direction, for causing the motor shaft 104 to move the valve 48 to null position.

The means 108 comprises, in this instance, a pair of relatively long links 110 pivotally connected by pins 112 to the cylinder 76 at opposite sides of the support 12 and at opposite sides of the unit axis relative to each other, and a pair of short link members 114 similarly pivoted, as by pins 116, to the motor 102, each at a side of the unit axis opposite to that of a corresponding one of the links 110, and a lever 118 for each corresponding link 110 and link member 114 pivotally mounted, as by a pin 120, on the support 12 having long and short arms 122 and 124 pivoted to the corresponding link 110 and link member 114, respectively.

A follow-up synchro 126 is resiliently connected to, and carried by, the motor 102 through the intermediary of a gear train structure 128 not germane to the present invention.

In operation, if a remote control synchro is turned to a new position, the shaft 104 of the motor 102 is caused to rotate in the correct direction to correspondingly axially linearly drive the valve 48 through the rotative action of the screw and jack 50 and 106, respectively.

Shifting of the valve 48 to the right, from the null position illustrated, causes the lands 54 and 56 to uncover the ports 30 and 32, in which action, the port 32 is placed in communication with the opening 53, and port 30 is connected through the passageway means 52 to the outlet 42.

This action causes oil to flow from the inlet 40, through the opening 44, the valve 48, the opening 53 and the port 32 to cause the cylinder 76 to move to the right.

As the cylinder 76 moves to the right, the long links 110 move one of the levers 118 clockwise and the other counterclockwise about the pins 120 to together pull the short link members 114 and the motor 102 to the left, as shown in Figure 2. This action imposes thrust on the motor shaft 104 to move the valve 48 to null position.

Movement of the valve 48 by the shaft 104 in the opposite direction, or to the left, provides communication for the pressure oil through the opening 53 and the port 30, and opens the port 32 to the drain 14, through the right hand end of the valve, through the member 96 and through the apertures 34, whereupon the cylinder 76 moves to the left.

Figure 4 illustrates diagrammatically how structure and results, similar to those above set forth, may be obtained with a stationarily mounted cylinder 130, a movable piston 132, and means 134 corresponding to the means 108.

Trunnions 136, on an arm or arms 137 of the cylinder 130, support a link or links 140 having slots 142 and carrying pins 144. The piston 132 carries a transversely slotted head 145 for the pins 144, whereby, when the piston is actuated, pins 146 in the slots 142 move a slidably mounted motor 138 to move a shaft 148 of the motor to move a valve 150 to null position, as in the previously described form. A piston shaft 152 has a portion 153 corresponding to the portions 86 of Figures 1 and 2.

Although only two embodiments of the invention have been illustrated and described, various changes in the form and relative arrangements of the parts, which will now appear to those skilled in the art, may be made without departing from the scope of the invention.

What is claimed is:

1. In a servo unit, the combination of a support having a drain and adapted to pivotally mount the unit on a base, a hollow piston shaft carrying a piston and mounted on said support and having radial ports at opposite sides of the piston, said shaft extending radially from one side of the support and having a duct communicating with said drain, a fluid pressure head outwardly of said support on said shaft having an inlet and a drain, a tubular valve having lands for said ports and a nut means and axially slidable in said shaft communicating with said inlet and providing a passageway between the valve and the shaft to said head drain, a cylinder slidable on said piston adapted for pivot connection to means to be actuated and having end walls at opposite sides of the piston and said ports in slidable sealed relation to said shaft, a reversible motor, a member slidable in said shaft having a portion extending therefrom at the opposite side of said support connected to said motor and providing communication through said duct between the valve and said first drain, a shaft of said motor extending through said member and being operatively connected to said nut means, a motor control device carried by the motor and connected thereto through a gear train, and linkage between the cylinder and the motor responsive to any movement of the cylinder along the shaft in either direction for causing the motor shaft to move the valve to null position.

2. In a servo unit, the combination of a support, a hollow piston shaft carrying a piston and supported by said support at one side of the latter, a fluid pressure head outwardly of said support on said shaft, a tubular valve axially slidable in said shaft having a nut means and ports at opposite sides of the piston, a cylinder between said support and said head slidable on said piston adapted for connection to means to be actuated and having end walls at opposite sides of the piston and said ports in slidable sealed relation to said shaft, a reversible motor, a hollow member slidable in said shaft having a portion at the opposite side of said support connected to said motor, a shaft of said motor extending through said hollow member and being operatively connected to said nut means, and connecting means between the cylinder and the motor responsive to any movement of the cylinder along the shaft in either direction for causing the motor shaft to move the valve to null position, said connecting means comprising a pair of links pivotally connected to the cylinder at opposite sides of said support and at opposite sides of the unit axis relative to each other, and a pair of link members similarly pivotally connected to the motor each at a side of the unit axis opposite to that of a corresponding one of said links, and a lever for each corresponding link and link member pivotally mounted on said support having long and short arms pivoted to the corresponding link and link member, respectively.

3. In a servo unit, the combinaton of a support having a drain, a hollow piston shaft including a piston integral with the shaft intermediate the shaft ends and having radial ports at opposite sides of the piston adjacent thereto, one of said ends being screw threaded into said support at one side thereof at right angles thereto intermediate said lengths in communication with said drain, a fluid pressure head outwardly of said support on said shaft, a tubular valve axially slidable in said shaft having a nut means, a cylinder between said support and said head slidable on said piston adapted for connection to means to be actuated and having end walls at opposite sides of the piston in slidable sealed relation to said shaft, a reversible motor, a member slidable in said shaft having a portion extending therefrom at the opposite side of said support connected to said motor, a shaft of said motor extending through said member and being operatively connected to said nut means, and means connected between the cylinder and the motor responsive to any movement of the cylinder along the shaft in either direction for causing the motor shaft to move the valve to null position.

4. In a servo unit, the combination of a support, a hollow piston shaft carrying a piston and secured at one end to said support at one side of the support, a fluid pressure head sealed on said shaft adjacent to the other shaft end including axially offset inlet and outlet openings communicating through separate openings in the shaft wall, a tubular valve axially slidable in said shaft having a nut means, a cylinder between said support and said head slidable on said piston adapted for connection to means to be actuated and having end walls at opposite sides of the piston in slidable sealed relation to said shaft, a reversible motor, a member slidable in said shaft having a portion extending therefrom at the opposite side of said support connected to said motor, a shaft of said motor extending through said member and being operatively connected to said nut means, and means connected between the cylinder and the motor responsive to any movement of the cylinder along the shaft in either direction for causing the motor shaft to move the valve to null position.

5. In a servo unit, the combination of a support, a hollow piston shaft carrying a piston and fixed to said support at one side of the support and having radial ports at opposite sides of the piston adjacent thereto, a fluid pressure head outwardly of said support on said shaft including axially offset inlet and outlet openings communicating through separate openings in the shaft wall, a tubular valve axially slidable in said shaft having a nut means and different outer diameters forming a pair of lands for said ports and a single land axially between said inlet and outlet, a cylinder between said support and said head slidable on said piston adapted for connection to means to be actuated and having end walls at opposite sides of the piston and said ports in slidable sealed relation to said shaft, a reversible motor, a member slidable in said shaft having a portion extending therefrom at the opposite side of said support connected to said motor, a shaft of said motor extending through said member and being operatively connected to said nut means, and means connected between the cylinder and the motor responsive to any movement of the cylinder along the shaft in either direction for causing the motor shaft to move the valve to null position.

6. In a servo unit, the combination of a support, a hollow piston shaft carrying a piston and supported by said support at one side of the latter, a fluid pressure head outwardly of said support on said shaft, a tubular valve axially slidable in said shaft having a nut means, a cylinder between said support and said head slidable on said piston having end walls at opposite sides of the piston in slidable sealed relation to said shaft, one of said walls being integral with the cylinder and having axial arms extending to positions at opposite sides of said head at which the arms are adapted for pivotal connection to means to be actuated, the other end wall of the cylinder being removably held thereto, a reversible motor, a member slidable in said shaft having a portion extending therefrom at the opposite side of said support connected to said motor, a shaft of said motor extending through said member and being operatively connected to said nut means, and means connected between the cylinder and the motor responsive to any movement of the cylinder along the shaft in either direction for causing the motor shaft to move the valve to null position.

7. In a servo unit, the combination of a support, a hollow piston shaft carrying a piston and supported by said support at one side of the latter, a fluid pressure head outwardly of said support on said shaft, a tubular valve axially slidable in said shaft having ports at opposite sides of the piston and a nut means, a cylinder between said support and said head slidable on said piston adapted for connection to means to be actuated and having end walls at opposite sides of the piston and said ports in slidable sealed relation to said shaft, a reversible motor, a hollow member slidable in said shaft having a portion at the opposite side of said support connected to said motor, a shaft of said motor extending through said hollow member and being operatively connected to said nut means, and means connected between the cylinder and the motor responsive to any movement of the cylinder along the shaft in either direction for causing the motor shaft to move the valve to null position.

8. In a servo unit, the combination of cylinder and piston elements having opposite relative movements, means providing ports communicating with the cylinder at opposite sides of the piston, valve means including a movable valve member controlling the flow of fluid through said ports, motor means for moving said valve member various amounts in opposite directions and effective in each direction to open one of said ports to fluid pressure and the other to exhaust to move one of said elements relative to the other element according to the extent of movement of the valve member, means movably mounting the motor means, and means including said movable mounting means cooperating between said one element and the valve member and responsive to movement of said one element relative to the other element for correspondingly opposing movement of the valve member in each direction and moving the later relative to the ports to stop said one member at any position to which it is moved.

9. In a servo unit, the combination of cylinder and piston elements having opposite relative movements of given extent, means providing ports communicating with the cylinder at opposite sides of the piston, valve means including a movable valve member controlling the flow of fluid through said ports, motor means, nut means operatively connecting said motor means to said valve member, said motor means for moving said valve member through said nut means various amounts of different extent in opposite directions and effective in each direction to open one of said ports to fluid pressure and the other to exhaust to move one of said elements relative to the other element according to the extent of movement of the valve member, means movably mounting said motor means, and means including said movable mounting means cooperating between said one element and the valve member and responsive to movement of said one element relative to the other element for correspondingly opposing movement of the valve member in each direction and moving the latter relative to the ports through said nut means to stop said one member at any position to which it is moved.

10. In a servo unit, the combination of a support, a cylinder element and a piston element having opposite relative movements of given extent, means providing ports communicating with the cylinder at opposite sides of the piston, valve means including a movable valve member controlling the flow of fluid through said ports, motor means for moving said valve member various amounts of different extent in opposite directions and effective in each direction to open one of said ports to fluid pressure and the other to exhaust to move one of said elements relative to the other element according to the extent of movement of the valve member, and means cooperating between said one element and the valve member and responsive to movement of said one element relative to said other element for correspondingly opposing movement of the valve member in each direction and moving the latter relative to the ports to stop said one member at any position to which it is moved, said last named means comprising a plurality of parallel pivotally connected links, a hinge point on said support for said links, said links to movably mount said motor means, and means operatively connecting said one element through said links to said valve member to render the movement of said valve member proportional to the movement of the aforesaid one element.

11. In a servo unit, the combination of fluid-responsive means including cylinder and piston members, one of which is adapted for connection to means to be actuated, valve means including an element having movement of different extent from that of said one member adapted to control fluid actuating said fluid responsive means, motor means operating means connected to said motor means and rotatively movable by said motor means for actuating said element linearly in opposite directions to actuate said fluid responsive means in opposite directions, and means movably mounting said motor means and operatively connected between said one member and said operating means responsive to movement of said one member in either direction for linearly moving through said motor means said operating means to move said element oppositely to null position in proportion to movement of said one member.

WALTER DORWIN TEAGUE, Jr.

REFERENCES CITED

The following references are of record in the file of this patent:

UNITED STATES PATENTS

| Number | Name | Date |
|---|---|---|
| 465,730 | Russell | Dec. 22, 1891 |
| 1,480,940 | Lang | Jan. 15, 1924 |
| 1,500,685 | Roberts | July 8, 1924 |
| 1,908,144 | Gros | May 9, 1933 |
| 2,299,430 | Sexton | Oct. 20, 1942 |
| 2,317,549 | Muller | Apr. 27, 1943 |
| 2,366,382 | Burton | Jan. 2, 1945 |
| 2,412,336 | Spencer | Dec. 10, 1946 |

Certificate of Correction

December 6, 1949

Patent No. 2,490,174

WALTER DORWIN TEAGUE, JR.

It is hereby certified that error appears in the printed specification of the above numbered patent requiring correction as follows:

Column 7, line 19, for "later" read *latter*;

and that the said Letters Patent should be read with this correction therein that the same may conform to the record of the case in the Patent Office.

Signed and sealed this 24th day of January, A. D. 1950.

[SEAL]

THOMAS F. MURPHY,
*Assistant Commissioner of Patents.*